US009146779B2

(12) United States Patent
Kihara (10) Patent No.: US 9,146,779 B2
(45) Date of Patent: Sep. 29, 2015

(54) SYSTEM AND METHOD FOR MIGRATING AN APPLICATION

(75) Inventor: Hideto Kihara, Kawasaki (JP)

(73) Assignee: FUJITSU LIMITED, Kawasakin (JP)

(*) Notice: Subject to any disclaimer, the term of this patent is extended or adjusted under 35 U.S.C. 154(b) by 806 days.

(21) Appl. No.: 13/424,693

(22) Filed: Mar. 20, 2012

(65) Prior Publication Data

US 2012/0254355 A1    Oct. 4, 2012

(30) Foreign Application Priority Data

Mar. 31, 2011  (JP) .................................. 2011-081135

(51) Int. Cl.
*G06F 15/16* (2006.01)
*G06F 9/48* (2006.01)
(52) U.S. Cl.
CPC .................................... *G06F 9/4856* (2013.01)
(58) Field of Classification Search
None
See application file for complete search history.

(56) References Cited

U.S. PATENT DOCUMENTS

| 6,401,134 B1 | 6/2002 | Razavi et al. | |
|---|---|---|---|
| 8,543,636 B1* | 9/2013 | Barnes | 709/201 |
| 2003/0067489 A1* | 4/2003 | Wong et al. | 345/765 |
| 2006/0149741 A1* | 7/2006 | Krishnamoorthy | 707/10 |
| 2007/0054627 A1* | 3/2007 | Wormald | 455/70 |
| 2008/0168010 A1* | 7/2008 | Challenger et al. | 706/12 |
| 2009/0106409 A1* | 4/2009 | Murata | 709/223 |
| 2009/0183181 A1* | 7/2009 | Subhraveti | 719/320 |
| 2010/0274869 A1* | 10/2010 | Warila et al. | 709/217 |
| 2010/0275204 A1 | 10/2010 | Kamura et al. | |
| 2012/0096069 A1* | 4/2012 | Chan | 709/203 |

FOREIGN PATENT DOCUMENTS

| JP | 11-167489 | 6/1999 |
|---|---|---|
| JP | 2003-330715 | 11/2003 |
| JP | 2009-75877 | 4/2009 |
| JP | 2010-257429 | 11/2010 |

OTHER PUBLICATIONS

Andrew S. Tanenbaum, Maarten van Steen, "Distributed Systems: Principles and Paradigms (2nd Edition)" Pearson Education, Sec 3.5.2, pp. 107-110, 2007.

(Continued)

*Primary Examiner* — Hamza Algibhah
*Assistant Examiner* — James Edwards
(74) *Attorney, Agent, or Firm* — Staas & Halsey LLP (57) ABSTRACT

A terminal and a server are each provided with identification information identifying a variable referencing a fixed resource that is referenced by an application when the application is executed. The terminal sets a predetermined value to a variable that is included in variables used by the application and identified by the identification information, and releases the fixed resource by setting a predetermined value to the variable identified by the identification information. The terminal extracts an execution state of the application, and transmits the execution state to the server. The server extracts a variable identified by the identification information from among variables used by the application, sets a value of the extracted variable to a corresponding variable of an instance generated based on the received execution state, and restarts the application stopped by the terminal, by activating the instance to which the value of the extracted variable was set.

4 Claims, 9 Drawing Sheets

(56) References Cited

OTHER PUBLICATIONS

BLCR Frequently Asked Questions (for version 0.8.2) [https://upc-bugs.lbl.gov//blcr/doc/html/FAQ.html#callbacks].
Berkeley Lab Checkpoint/restart (BLCR) User's Guide [https://upc-bugs.lbl.gov//blcr/doc/html/BLCR_Users_Guide.html].
Jason Duel!, Lawrence Berkeley, National Laboratory, "The Design and Implementation of Berkeley Lab's Linux Checkpoint/Restart".
Japanese Office Action dated Oct. 7, 2014 in corresponding Japanese Patent Application No. 2011-081135.

* cited by examiner

FIG. 2

| CLASS NAME | MEMBER VARIABLE NAME |
|---|---|
| CalcThread | b |
| CalcThread | c |

| INSTANCE TYPE | INSTANCE REFERENCE (ADDRESS) |
|---|---|
| MIGRATION INSTANCE | COMPUTATION PROCESSING UNIT |
| WRAPPER INSTANCE | COMPUTATION PROCESSING UNIT WRAPPER |

| CLASS NAME | MEMBER VARIABLE NAME |
|---|---|
| COMPUTATION PROCESSING UNIT WRAPPER | calcThread |

SYSTEM AND METHOD FOR MIGRATING AN APPLICATION

CROSS-REFERENCE TO RELATED APPLICATION(S)

This application is based upon and claims the benefit of priority of the prior Japanese Patent Application No. 2011-081135, filed on Mar. 31, 2011, the entire contents of which are incorporated herein by reference.

FIELD

The embodiments discussed herein are related to a system and method for migrating an application.

BACKGROUND

Hitherto, for example, in migration of a Java application between devices, one device stores the execution status, converts the execution status in an internal format into a byte sequence, and transmits the converted byte sequence to the other device, during the execution of the application. The other device converts the received execution status in the form of a byte sequence into the internal format, and restarts the execution status converted into the internal format. The technique for storing the execution status is referred to as "Checkpoint". The technique for restarting the execution status is referred to as "Restart". The technique for converting the execution status in the internal format into a byte sequence is referred to as "serialization". The technique for converting the execution status in the form of a byte sequence into an internal format is referred to as "deserialization".

A technique in which in order to separate a Java applet from a browser and display the separated Java applet, on a unique window, the separated portion is clearly identified on the source code of the Java applet by a developer or the like, is available. Furthermore, a technique in which the layout or page size of a graphical user interface (GUI) of an application to be migrated is dynamically changed so as to correspond to a target platform, is also available. Furthermore, a technique in which for migration of an application between devices, when a source device includes a fixed resource that does not achieve serialization, variables are rebound so that a fixed resource in a destination device is referenced, is also available.

Examples of related art are disclosed, for example, in Japanese Laid-open Patent Publication Nos. 11-167489 and 2003-330715.

A further example of related art is disclosed, for example, in Andrew S. Tanenbaum, *"Distributed Systems: Principles and Paradigms, Second Edition"*.

SUMMARY

According to an aspect of the invention, a system includes a terminal and a server. The terminal executes an application, and stores first identification information identifying a variable referencing a first fixed resource that is referenced by the application when the application is executed. The terminal sets a predetermined value to a variable that is included in variables used by the application and is identified by the first identification information, and release the first fixed resource. The terminal extracts an execution state of the application by stopping the application, and transmits the execution state to the server. The server activates the application, and receives the execution state transmitted from the terminal. The server stores second identification information identifying a second fixed resource that is referenced by the application. The server extracts a variable identified by the second identification information from among variables used by the application, and sets a value of the extracted variable to a corresponding variable of an instance generated based on the received execution state. Then, the server restarts the application stopped by the terminal, by activating the instance to which the value of the extracted variable was set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the known techniques mentioned above, rebinding for a fixed resource is not easily achieved.

More specifically, in related art, before and after migration, a human being understands an application and provides a description to the source code so that a cutting and binding process for the relationship between a migration portion and a fixed resource is performed. Furthermore, in related art, rebinding is performed for fixed resources other than a GUI. Thus, time and effort is consumed for rebinding for fixed resources, and rebinding for fixed resources is not easily achieved.

Hereinafter, systems and migration methods according to embodiments will be explained in detail with reference to the drawings. The embodiments do not limit disclosed techniques. The embodiments may be combined together in an appropriate manner as long as consistency in processing is maintained.

First Embodiment

Figure 1:
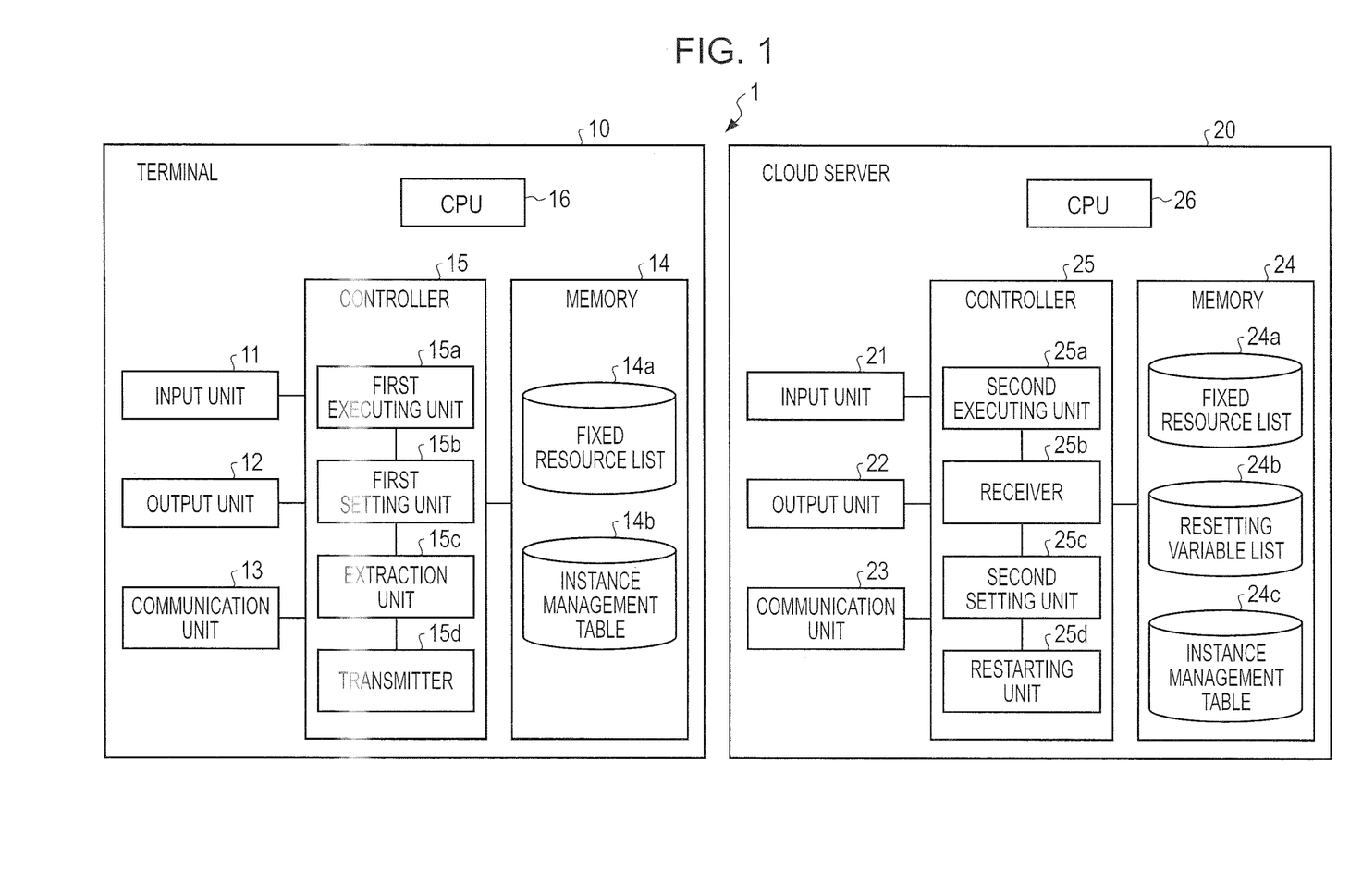
FIG. 1 is a diagram illustrating a configuration example of a cloud system, according to an embodiment.

FIG. 1 is a diagram illustrating a configuration example of a cloud system, according to an embodiment. A cloud system 1 according to the embodiment includes a terminal 10 and a cloud server 20. Although a case where the cloud system 1 includes one terminal 10 and one cloud server 20 is illustrated in the example of FIG. 1, the number of terminals 10 and the number of cloud servers 20 are not limited to this. For example, the cloud system 1 may include a plurality of terminals 10 and a plurality of cloud servers 20. The terminal 10 may be a cellular phone such as a smartphone, a personal digital assistants (PDA) device, or a personal computer (PC). In the cloud system 1, the terminal 10 and the cloud server 20 are in conjunction with each other. The execution status of an application that is being executed in the terminal 10 is migrated to the cloud server 20, and the cloud server 20 executes the application starting from a point at which the migration was performed. Accordingly, the consumption of a battery of the terminal 10 is reduced, and the processing speed of the application is increased.

Here, it is assumed that the execution status of an application being executed in the terminal 10 is migrated to the cloud sever 20, the cloud server 20 executes the application starting from a point at which the migration was performed, and the screen of the application executed in the cloud server 20 is transferred to the terminal 10 and displayed on the terminal 10. In this case, the screen is displayed in a seamless manner. Thus, it looks like as if the terminal 10 processes the application at high speed. A Java application including a GUI is an example of an application executed by the terminal 10 and the cloud server 20. In the following description, an example of a case where an application executed by the terminal 10 and the cloud server 20 is a Java application including a GUI will be explained as a typical example.

Here, it is assumed that a Java application including a GUI is migrated. For a GUI framework, a native library is used for displaying screens. In the case of a GUI framework, the content of the native library stored in a memory, which is used for extracting an execution status, is not acquired from Java. Thus, in the case of migration of the Java application including a GUI, since the GUI framework does not output the execution status as a byte sequence, transfer of a byte sequence to another device is not achieved. In this case, in order to achieve migration, a serializable portion may be separated from an unserializable, fixed resource portion. For example, a computation processing portion, which is a serializable portion, might be changed to have a structure not depending on a fixed resource. However, such a change takes cost including time and effort. Furthermore, data base (DB) connection, socket connection, devices such as a camera and a global positioning system (GPS), and the like, as well as a GUI, are examples of fixed resources.

The terminal 10 and the cloud server 20 provided in the cloud system 1 according to the embodiment may easily achieve rebinding for fixed resources. For example, the terminal 10 may be configured to include an input unit 11, an output unit 12, a communication unit 13, a memory 14, and a controller 15.

The input unit 11 inputs various types of information to the controller 15. For example, the input unit 11 receives a migration request from a user, and inputs the received migration request to the controller 15. Examples of devices of the input unit 11 include a mouse and a keyboard.

The output unit 12 outputs various types of information. For example, in the case where an image is received from the controller 15, the output unit 12 displays and outputs the image. Examples of devices of the output unit 12 include a cathode ray tube (CRT) and a liquid crystal display.

The communication unit 13 performs wireless communication. For example, the communication unit 13 performs data transmission between the controller 15 and the cloud server 20 by performing wireless communication with the cloud server 20. Upon receiving information from the controller 15, the communication unit 13 wirelessly transmits the received information to the cloud server 20. Upon receiving information from the cloud server 20, the communication unit 13 sends the received information to the controller 15. An example of the communication unit 13 includes a wireless communication interface.

The memory 14 stores a fixed resource list 14a and an instance management table 14b. In the fixed resource list 14a, the class names and variable names of individual member variables for referencing fixed resources are registered in association with each other.

Figure 2:
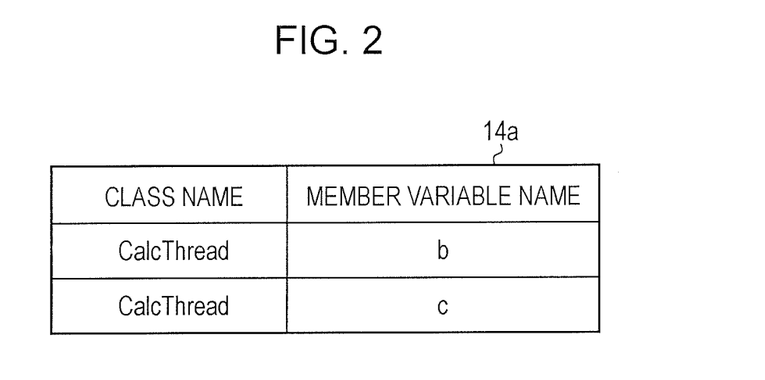
FIG. 2 is a diagram illustrating an example of a fixed resource list, according to an embodiment.

FIG. 2 is a diagram illustrating an example of a fixed resource list, according to an embodiment. In the example of FIG. 2, in the fixed resource list 14a, a class having the class name "CalcThread" and a member variable having the member variable name "b" are registered in association with each other. Furthermore, in the example of FIG. 2, in the fixed resource list 14a, a class having the class name "CalcThread" and a member variable having the member variable name "c" are registered in association with each other.

Figure 3:
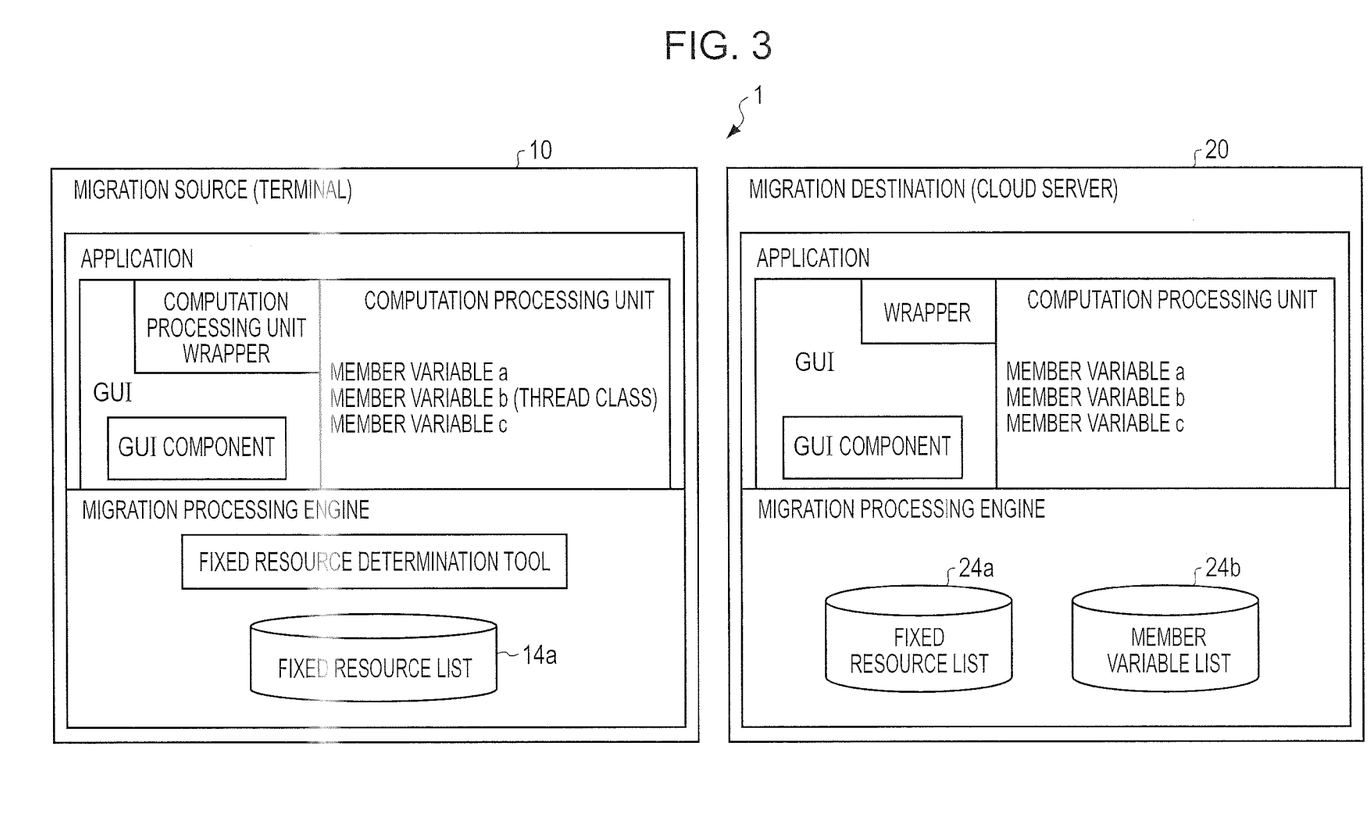
FIG. 3 is a schematic diagram illustrating an example of a method for extracting a class name and a member variable name registered in a fixed resource list, according to an embodiment.

FIG. 3 is a schematic diagram illustrating an example of a method for extracting a class name and a member variable name registered in a fixed resource list, according to an embodiment. In the example of FIG. 3, the terminal 10 and the cloud server 20 are schematically illustrated. In the example of FIG. 3, a developer or the like alters the application to generate the fixed resource list 14a using a fixed resource determination tool. The developer or the like activates the fixed resource determination tool by designating a computation processing thread class to be migrated.

The fixed resource determination tool will now be explained. The fixed resource determination tool is a tool that performs "checkpoint" processing for a computation processing thread class, and registers, in the fixed resource list 14a, a member variable for which an "exception" occurs at the time of serialization and the class name of the computation processing thread class. In this way, a class name and a member variable name are extracted and registered in each of the fixed resource list 14a and a fixed resource list 24a which will be described later.

Description will be given of an example of a method for generating a resetting variable list 24b stored in a memory 24 of the cloud server 20 which will be described later, with reference to FIG. 3. A developer or the like of the cloud system 1 alters a source code of the application so that the source code describes processing that is performed when receiving a migration request from a user. For example, the developer or the like inserts, into the source code, a code for calling an application program interface (API) for migration by designating a computation processing thread to be migrated. The developer or the like also changes a portion of the source code at which a computation processing unit is referenced by the GUI so that the portion is coded using a computation processing unit wrapper. The developer or the like also registers, within the computation processing wrapper, variables that reference the computation processing unit, in the resetting variable list 24b which will be described later.

The developer or the like causes the terminal 10 and the cloud server 20 to store the altered application and the generated fixed resource list in the memory thereof. The developer or the like also causes the cloud server 20 to store the resetting variable list 24b in the memory 24 thereof.

Figure 4:
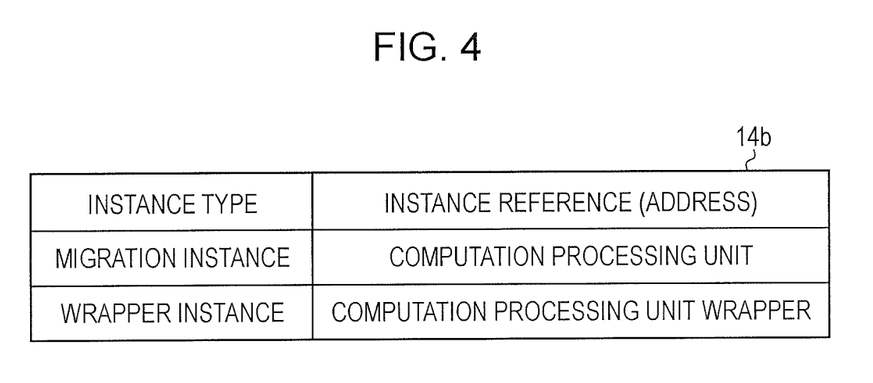
FIG. 4 is a diagram illustrating an example of an instance management table, according to an embodiment.

FIG. 4 is a diagram illustrating an example of an instance management table, according to an embodiment. As depicted in FIG. 4, instance types, which are types of instances to be migrated, and instance references (addresses) are registered in association with each other in the instance management table 14b. In the example of FIG. 4, an address indicating "computation processing unit" is registered as a "migration instance" in the instance management table 14b. Furthermore, in the example of FIG. 4, "computation processing unit wrapper" is registered as a "wrapper instance" in the instance management table 14b.

Referring back to FIG. 1, the memory 14 may be, for example, a semiconductor memory element, such as a flash memory, or a storage device, such as a hard disk or an optical disk. The memory 14 is not limited to the storage device of the above-mentioned type. For example, the memory 14 may be a random access memory (RAM), a read only memory (ROM), or the like.

The controller 15 may include an internal memory for storing programs defining various processing operations and control data, and performs various types of processing in accordance with the programs and the control data. As illustrated in FIG. 1, the controller 15 may be configured to include a first executing unit 15a, a first setting unit 15b, an extraction unit 15c, and a transmitter 15d.

The first executing unit 15a executes an application. For example, the first executing unit 15a executes a Java application including a GUI. As described above, the source code of the application is altered by a developer or the like. For example, in such an application, a class name and a member variable name are extracted and registered in the fixed resource list 14a, and processing that is performed when a migration request is received is described in the source code. Here, the processing is performed based on the extracted class name and member variable name.

Figure 5:
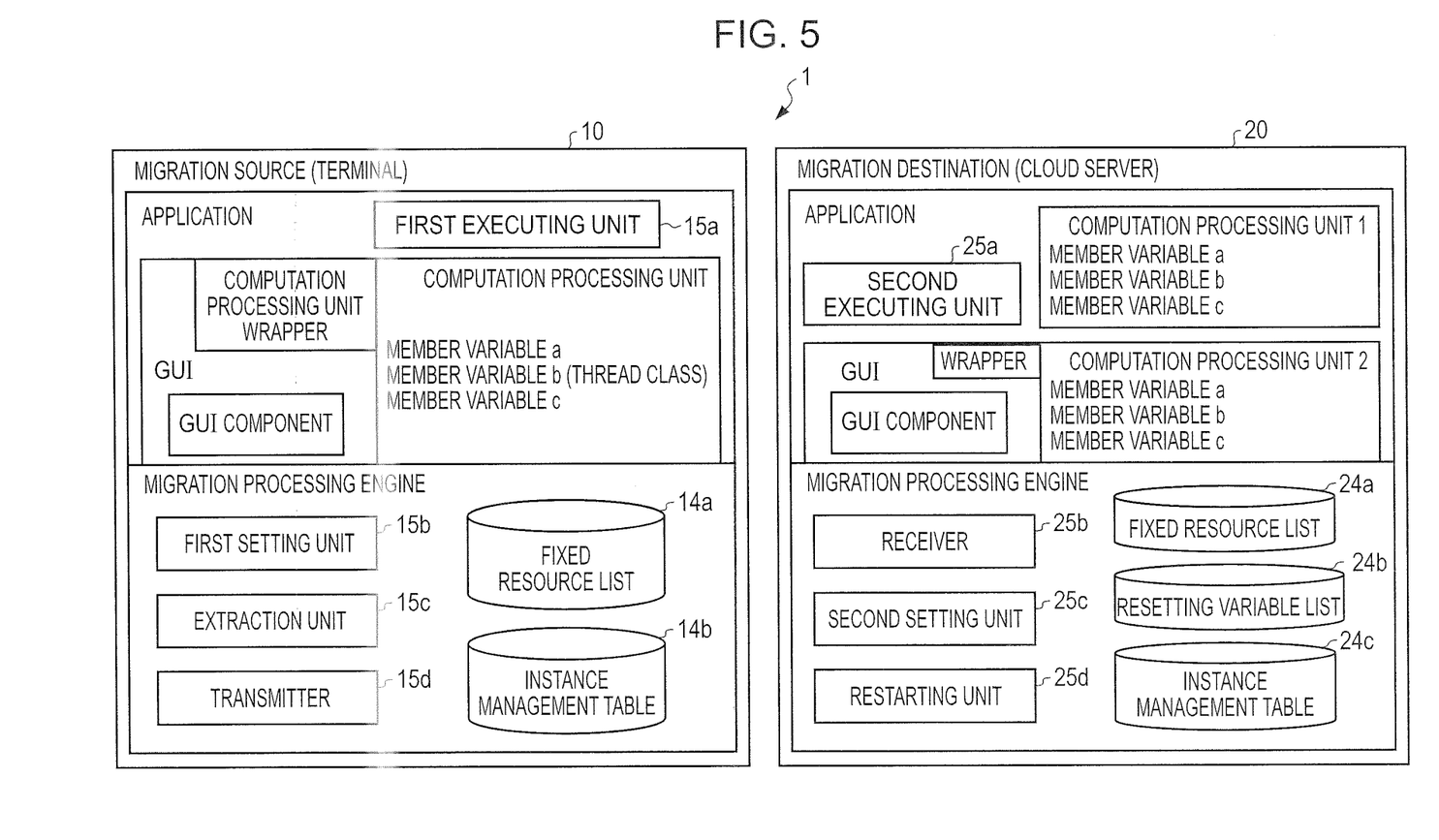
FIG. 5 is a schematic diagram illustrating an example of processing performed by a terminal and a cloud server, according to an embodiment.

FIG. 5 is a schematic diagram illustrating an example of processing performed by a terminal and a cloud server, according to an embodiment. In the example of FIG. 5, processing performed by the terminal 10 and the cloud server 20 is schematically illustrated. Upon receiving a migration request from the input unit 11, the first executing unit 15a of the terminal 10 transmits, to the cloud server 20, an application execution request for requesting the cloud server to execute an application. Upon receiving the application execution request, the cloud server 20 executes the application. Then, the first executing unit 15a of the terminal 10 calls an API that is provided by a migration processing engine and used for migration processing. The migration processing engine instructs the first setting unit 15b to set a certain value, for example, null, to a member variable name of a thread class corresponding to a class name and a member variable name registered in the fixed resource list 14a.

The first setting unit 15b sets a value to a member variable that is included in variables used in the application executed by the first executing unit 15a and is used for referencing a fixed resource that is referenced at the time of executing the application, and then releases the fixed resource.

The extraction unit 15c stops the application, and extracts the execution status of the application. In the example of FIG. 5, when the first setting unit 15b receives an instruction from the migration processing engine, the first setting unit 15b performs the processing described below. That is, the first setting unit 15b sets a certain value, for example, null, to a member variable of a thread class corresponding to a class name and a member variable name registered in the fixed resource list 14a. Furthermore, in the example of FIG. 5, the extraction unit 15c stops the computation processing unit running on the terminal 10, performs "checkpoint" processing on the stopped computation processing unit, and extracts the execution status including variable values, a stack content, and a execution location. For example, the stack content contains local variable values and a method call history.

The transmitter 15d of the terminal 10 transmits the execution status to the cloud server 20. In the example of FIG. 5, the transmitter 15d serializes the extracted execution status, and transmits the serialized execution status to the cloud server 20.

Referring back to FIG. 1, the cloud server 20 may be configured to include an input unit 21, an output unit 22, a communication unit 23, a memory 24, and a controller 25.

The input unit 21 of the cloud server 20 inputs various types of information to the controller 25. Examples of devices of the input unit 21 include a mouse and a keyboard.

The output unit 22 of the cloud server 20 outputs various types of information. For example, upon receiving an image from the controller 25, the output unit 22 performs control such that the image is displayed on an external display screen.

The communication unit 23 of the cloud server 20 performs wireless communication. For example, the communication unit 23 performs wireless communications between the controller 25 and the terminal 10. Upon receiving information from the controller 25, the communication unit 23 wirelessly transmits the received information to the terminal 10. Upon receiving information from the terminal 10, the communication unit 23 sends the received information to the controller 25. Examples of the communication unit 23 include a wireless communication interface.

The memory 24 of the cloud server 20 stores a fixed resource list 24a, a resetting variable list 24b, and an instance management table 24c. In the fixed resource list 24a, the same content as that of the fixed resource list 14a is registered. That is, in the fixed resource list 24a, identification information identifying a variable referencing a fixed resource that is referenced by the application is registered. Furthermore, in the resetting variable list 24b, a variable referencing the computation processing unit is registered.

Figure 6:
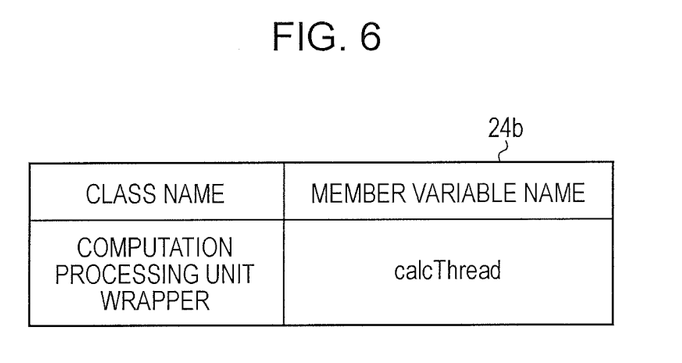
FIG. 6 is a diagram illustrating an example of a resetting variable list, according to an embodiment.

FIG. 6 is a diagram illustrating an example of a resetting variable list, according to an embodiment. In the example of FIG. 6, information indicating that the name of a member variable referencing a wrapper whose class name is a "computation processing unit wrapper" is "calcThread" is registered.

The instance management table 24c may be configured to be similar to the instance management table 14b described above. Therefore, the explanation of the instance management table 24c will be omitted here.

Referring back to FIG. 1, the memory 24 of the cloud server 20 may be implemented as, for example, a semiconductor memory element, such as a flash memory, or a storage device, such as a hard disk or an optical disk. The memory 24 is not limited to the storage device of the above-mentioned type. The memory 24 may be implemented as a RAM, a ROM, or the like.

The controller 25 of the cloud server 20 includes an internal memory for storing programs defining various processing operations and control data. The controller 25 executes various types of processing in accordance with the programs and the control data. As illustrated in FIG. 1, the controller 25 may be configured to include a second executing unit 25a, a receiver 25b, a second setting unit 25c, and a restarting unit 25d.

The second executing unit 25a executes an application. For example, the second executing unit 25a executes a Java application including a GUI. As described above, the above application is an application whose source code has been altered by a developer or the like. For example, for such an application, a class name and a member variable name are extracted from the source code thereof and registered in the fixed resource list 24a, and processing that is performed when a migration request is received is described in the source code thereof. Here, the processing is performed based on the extracted class name and member variable name. In the example of FIG. 5, computation processing unit 1 is activated as a registered instance by the second executing unit 25a.

The receiver 25b of the cloud server 20 receives an execution status transmitted from the transmitter 15d. In the example of FIG. 5, upon receiving an execution status transmitted from the transmitter 15d of the terminal 10, the receiver 25b deserializes the received execution status, and generates a new instance (computation processing unit 2) of the computation processing unit.

The second setting unit 25c of the cloud server 20 extracts the value of a member variable indicated by identification information registered in the fixed resource list 24a stored in the memory 24, from among variables used in the application executed by the second executing unit 25a, and performs the processing described below. That is, the second setting unit 25c sets the extracted member variable value to the corresponding variable of an instance generated based on the execution status received by the receiver 25b. In the example of FIG. 5, the second setting unit 25c sets the member variable values b and c that are included in variables used in the computation processing unit 1 and indicated by identification information registered in the fixed resource list 24a, to the corresponding variables of the computation processing unit 2, that is, to the member variables b and c of the computation processing unit 2. Furthermore, in the example of FIG. 5, the second setting unit 25c changes a reference destination of the computation processing unit wrapper from the computation processing unit 1 to the computation processing unit 2.

The restarting unit 25d of the cloud server 20 restarts the application stopped by the terminal 10, by restarting an instance set by the second setting unit 25c. In the example of FIG. 5, the restarting unit 25d restarts the application stopped by the terminal 10, by stopping the computation processing unit 1 and restarting the computation processing unit 2.

Description has been given of migration from the terminal 10 to the cloud server 20. Here, it is further assumed that the cloud server 20 has functions similar to those of the first executing unit 15a, the first setting unit 15b, the extraction unit 15c, and the transmitter 15d that are provided in the controller 15 of the terminal 10. Further, it is also assumed that the terminal 10 has functions similar to those of the second executing unit 25a, the receiver 25b, the second setting unit 25c, and the restarting unit 25d that are provided in the controller 25 of the cloud server 20, and that of the resetting variable list 24b of the cloud server 20. In this case, migration from the cloud server 20 to the terminal 10 may also be performed in a manner similar to the migration from the terminal 10 to the cloud server 20.

Figure 7:
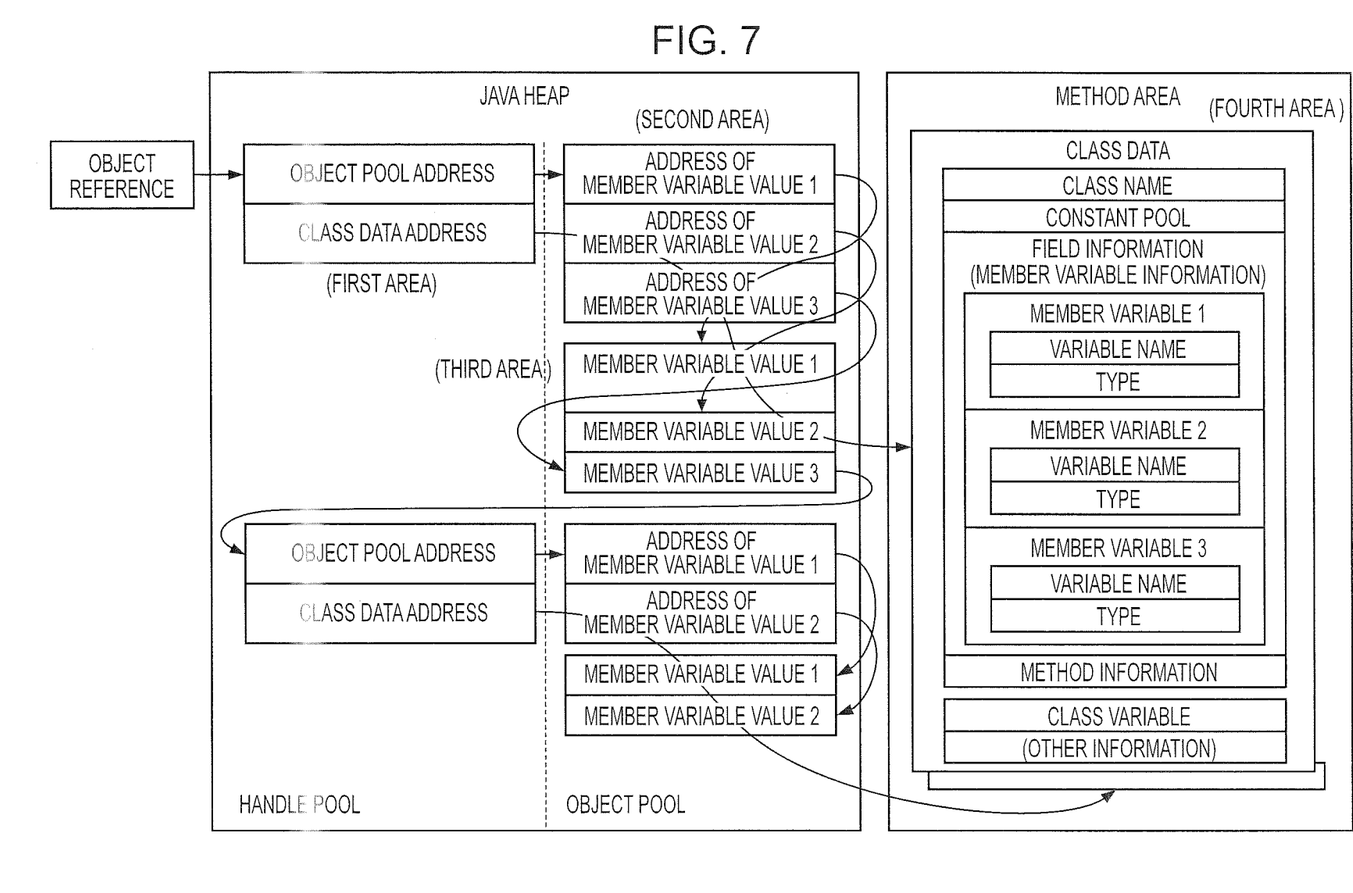
FIG. 7 is a diagram illustrating an example of a method for updating a member variable value, according to an embodiment.

FIG. 7 is a diagram illustrating an example of a method for updating a member variable value, according to an embodiment. In a Java virtual machine, for example, variables are managed as described below. An object reference of an intended object identifies a first area in a handle pool within a Java heap memory area, where the first area stores an object pool address and a class data address. The object pool address identifies a second area that stores addresses of member variable values (member variable value addresses) associated with the intended object, where the address of the each member variable value (the each member variable value address) identifies a third area that stores the each member variable value. That is, the each member variable value is stored in the third area identified by the corresponding member variable value address stored in the second area. Here, when the type of a member variable is a class, the address of an instance of the class (object reference) is stored, as a member variable value, in the third area.

The class data address identifies a fourth area that is arranged in a method area and stores class data defining a class structure of the intended object. The class data includes a class name, a constant pool, field information, method information, a class variable, and the like, where the field information stores pieces of member variable information including the member variable name and type of the member variable.

At the time of starting migration, an object reference of an intended object to be migrated is specified. In the fixed resource lists 14a and 24a, which are used when cutting and binding a fixed resource, the class name and variable name of each member variable that references the fixed resources are registered, for example, as described in operations (A1) to (A4) below.

(A1) Acquire a class name from class data stored in a fourth area identified by the class data address stored in the first area identified by the object reference of the intended object to be migrated, and extract member variable names corresponding to the acquired class name from a fixed resource list.

(A2) Search the field information (the member variable information) stored in the class data for each member variable name extracted from the fixed resource list in operation (A1), and identify an order (an index number) assigned to the member variable identified by the each member variable name.

(A3) Set null to the member variable value stored in a third area that corresponds to the index number identified in operation (A2) within the object pool associated with the object reference of the intended object.

(A4) When the type of the each member variable in the field information (the member variable information) of the class data acquired in operation (A1) indicates a class, identify a third area that corresponds to the index number of the each member variable in a manner similar to that of operation (A3), and acquire the member variable value, that is, the address of an instance of the class (the object reference), that is stored in the identified third area. Then, perform operations (A1) to (A4) in a recursive manner for the acquired object reference.

When performing "checkpoint" processing, a library (for example, Apache Commons Javaflow) enabling extraction of an execution status may be used. This library enables extraction of an execution status, such as local variable values, a method call history, and a current execution location, by changing a compiled Java program (byte code).

Serialization may be performed, for example, by delivering the execution status extracted in the "checkpoint" processing, as an object to be migrated, to a serialization method included in Java (java.io.ObjectOutputStream#writeObject( )). In the serialization method included in Java, when performing serialization on member variables, for example, the operations (B1) described below may be performed.

(B1) Acquire field information (member variable information) from class data stored in a fourth area identified by the class data address stored in the first area associated with an object reference of the intended object to be migrated, and extract the type of each member variable included in the acquired field information. Then, acquire a member variable value stored in a third area within the object pool. When the type of the acquired member variable value is a basic data type or String class, the acquired variable value is written out as a byte sequence. When the type of the acquired member variable value is a class, perform operation (B1) in a recursive manner to write out a byte sequence.

When performing deserialization, for example, an object having the same content as that before serialization is generated by reading the serialized byte sequence using a deserialization method included in Java (java.io.ObjectInputStream#readObject( )).

In the deserialization method included in Java, the operations (C1) to (C5) described below may be performed when deserializing member variables.

(C1) Search a method area for a class data corresponding to a class name included in the serialized byte sequence, and acquire field information (member variable information) from the class data that has been searched for.

(C2) Acquire a second area for storing the addresses of member variable values within an object pool.

(C3) Store, in the first area within the handle pool, an address identifying the acquired second area as an object pool address.

(C4) Acquire the type of each member variable from the serialized byte sequence. When the type of the each member variable is neither a basic data type nor String class, operations (C2) to (C5) are performed in a recursive manner. When the type of the each member variable is a basic data type or String class, acquire the value of the each member variable (the each member variable value) from the serialized byte sequence. Acquire, within the object pool, a third area for storing the each member variable value, and set the acquired each member variable value to the acquired third area within the object pool.

(C5) Set an address identifying the acquired third area for storing the each member variable value to the second area acquired in operation (C2), as the address of the member variable value.

When setting, to member variables referencing the fixed resources, reference to the fixed resources of the migration destination, for example, operations (D1) to (D5) described below may be performed.

(D1) Acquire a class name from class data stored in a fourth area identified by a class data address associated with the object reference of the deserialized object, and extract, from the fixed resource list, member variable names associated with the acquired class name.

(D2) Search the field information (the member variable information) of the class data for each member variable name extracted in operation (D1), and identify an order (an index number) of the member variable identified by the member variable name that has been searched for.

(D3) Acquire a migration instance (object reference) from an instance management table, and acquire a member variable value stored in a first area that is included in an object pool associated with the object reference of the migration instance and corresponds to the index number identified in operation (D2).

(D4) Set the member variable value acquired in operation (D3) to a third area (for storing a member variable value) that is included in an object pool associated with the object reference of the deserialized object and corresponds to the index number identified in operation (D2).

(D5) When the type of a member variable of the field information (the member variable information) of the class data acquired in operation (D1) is a class, identify the address of a third area corresponding to the member variable in a manner similar to operation (D4), and acquire the member variable value (object reference) stored in the identifies third area. Then, perform reference) stored in the identified third area. Then perform operations (D1) to (D5) in a recursive manner for the acquired member variable value (object reference).

When resetting member variable values, for example, operations (E1) to (E4) described below may be performed.

(E1) Acquire a wrapper instance (object reference) from the instance management table, acquire a class name from class data associated with the object reference of the acquired wrapper instance, and extract, from a resetting variable list, member variable names associated with the acquired class name.

(E2) Search the field information (the member variable information) of the class data for each member variable name extracted in operation (E1), and identify an order (an index number) of a member variable identified by the each member variable name.

(E3) Acquire a migration instance (object reference) from the instance management table.

(E4) When a member variable value stored in a first area that is included in an object pool associated with the object reference of the wrapper instance and corresponds to the index number identified in operation (E2) is equal to the value acquired in operation (E3), change the member variable value stored in the first area into the deserialized object reference.

In order to restart an instance, the restarting unit 25d uses a "Restart". In a "Restart", a "Restart" function of a library used at the time of performing "checkpoint" processing may be used so that the processing is restarted from the point of the execution status that was extracted by the "checkpoint" processing.

Referring back to FIG. 1, the controller 25 may be implemented as an integrated circuit, such as an application specific integrated circuit (ASIC) or a field programmable gate array (FPGA), or an electronic circuit, such as a central processing unit (CPU) or a micro-processing unit (MPU).

Figure 8A:
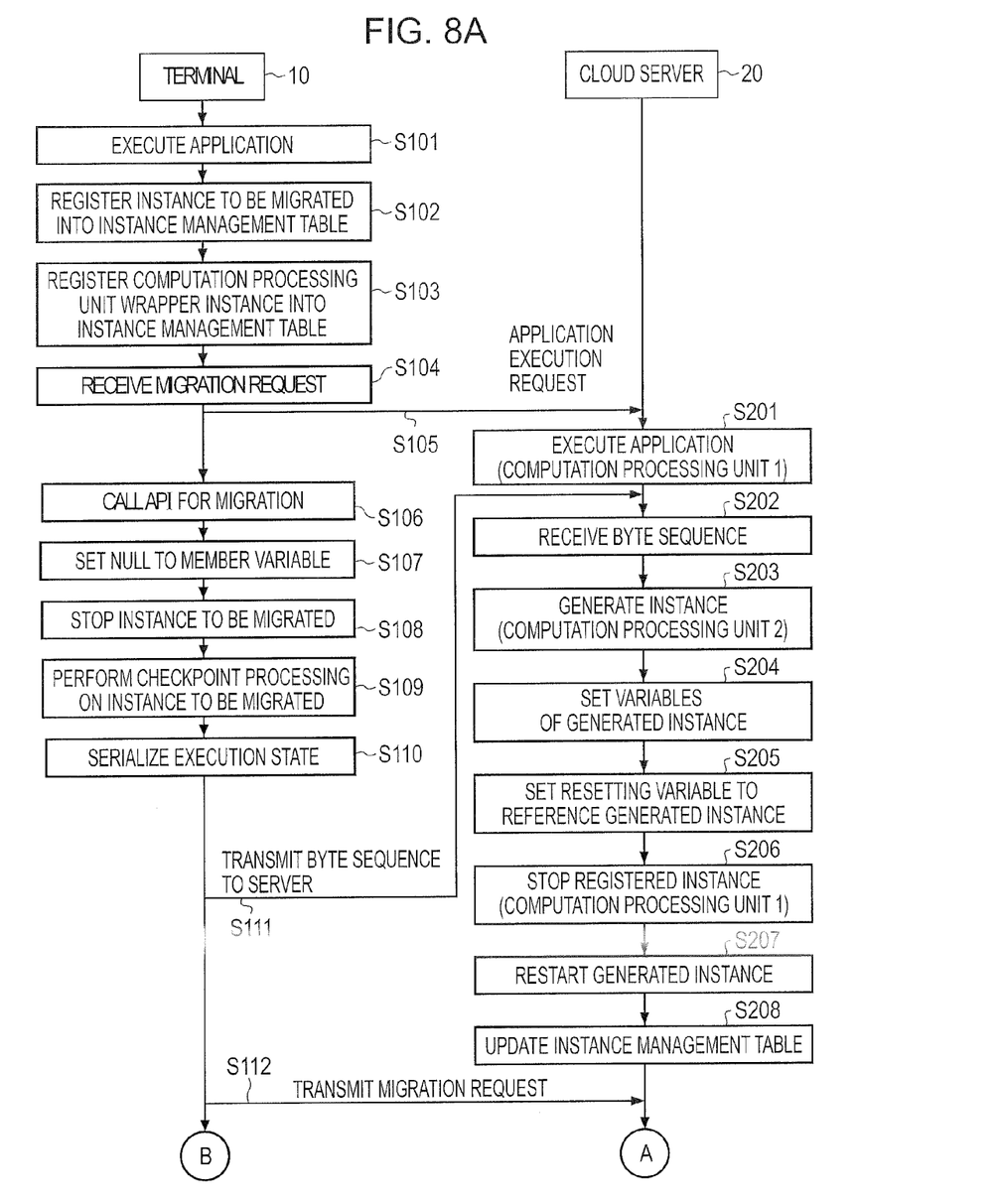
FIGS. 8A, 8B are diagrams illustrating an example of an operational flowchart performed by a cloud system, according to an embodiment.
Figure 8B:
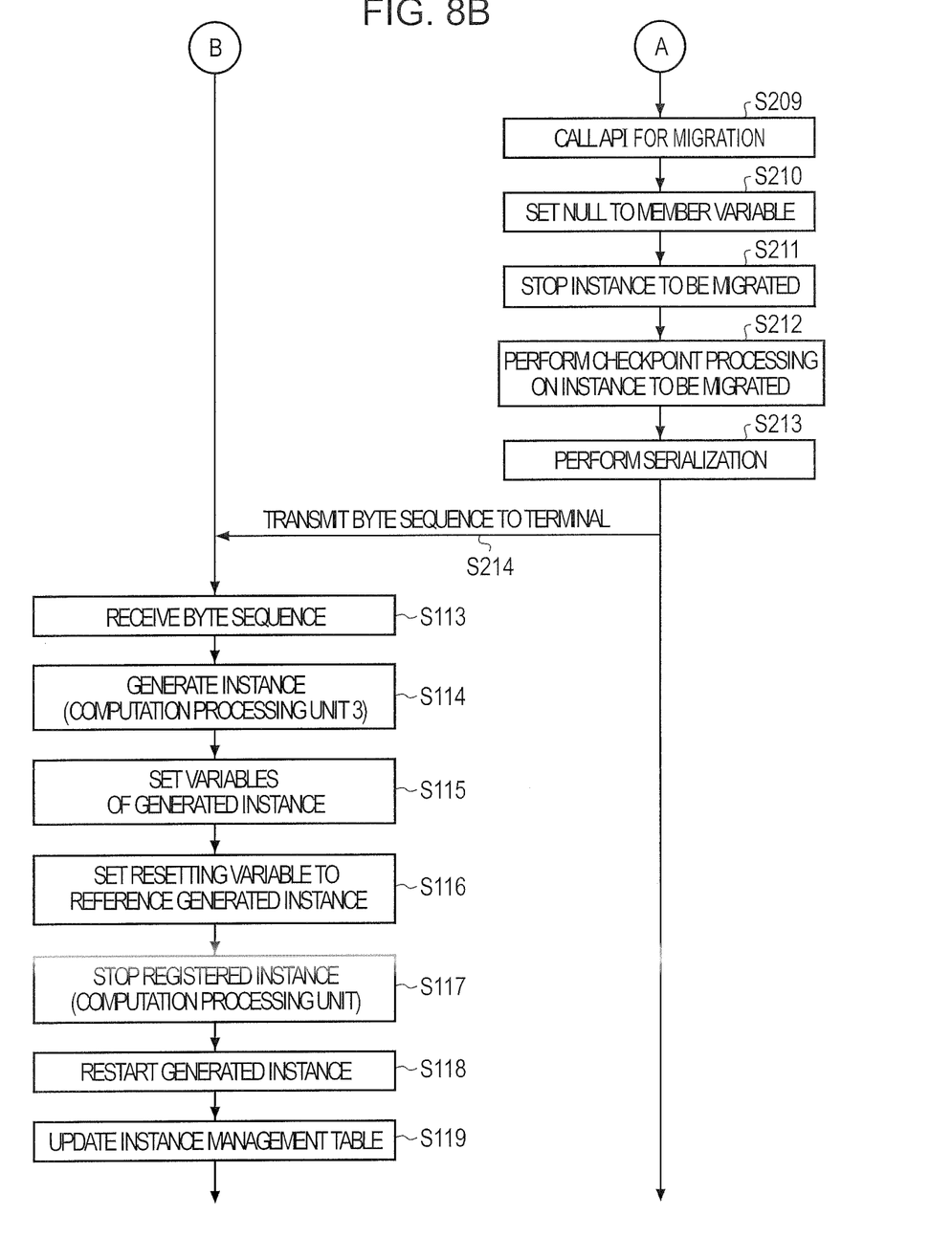

FIGS. 8A and 8B are diagrams illustrating an example of an operational flowchart performed by a cloud system, according to an embodiment.

In operation S101 of the terminal 10, the first executing unit 15a executes an application.

In operation S102, the first executing unit 15a registers an instance to be migrated into the instance management table 14b.

In operation S103, the first executing unit 15a registers a computation processing unit wrapper instance into the instance management table 14b.

In operation S104, the first executing unit 15a receives a migration request.

In operation S105, upon receiving the migration request, the first executing unit 15a transmits to the cloud server 20 an application execution request for requesting the cloud server 20 to execute the application.

In operation S201 of the cloud server 20, upon receiving the application execution request from the terminal 10, the second executing unit 25a of the cloud server 20 activates the application, for example, by activating the computation processing unit 1 as the registered instance.

In operation S106 of the terminal 10, the first executing unit 15a calls an API for migration, which is provided by migration processing engine.

In operation S107, setting unit 15b sets a predetermined value, for example, null, to a member variable of a thread class corresponding to a class name and a member variable name registered in the fixed resource list 14a.

In operation S108, the extraction unit 15c stops the instance to be migrated.

In operation S109, the extraction unit 15c performs "checkpoint" processing on the instance to be migrated, and extracts the execution state including variable values, stack content, and an execution location.

In operation S110, the transmitter 15*d* serialized the extracted execution state.

In operation S111, the transmitter 15*d* transmits to the cloud server 20 a byte sequence of the serialized execution state.

In operation of the cloud server 20, the receiver 25*b* of the cloud server 20 receives the byte sequence of the execution state transmitted from the transmitter 15*d* of the terminal 10.

In operation S203, the receiver 25*b* deserializes the received execution state, and generates a new instance of a computation processing unit (computation processing unit 2).

In operation S204, the second setting unit 25*c* sets variables of the generated instance (the computation processing unit 2) so that a value of a first variable that is included in variables used by the application executed by the second executing unit 25*a* (the registered instance: the computation processing unit 1) and is identified by identification information registered in the fixed resource list 24*a* stored in the memory 24 is set to a second variable that corresponds to the first variable within the generated instance (the computation processing unit 2).

In operation S205, the second setting unit 25*c* sets the computation processing unit wrapper as a resetting variable so that a reference destination of the computation processing unit wrapper is changed from the instance that has been executed (the registered instance: the computation processing unit 1) to the newly generated instance (the generated instance: the computation processing unit 2).

In operation S206, the restarting unit 25*d* stops the registered instance (the computation processing unit 1).

In operation S207, the restarting unit 25*d* restarts the application that was stopped by the terminal 10, by restarting the generated instance ("Restart").

In operation S208, the restarting unit 25*d* updates the instance management table 24*c* so that an instance reference value of the migration instance is changed to that of the generated instance, by regarding the generated instance as an instance to be migrated.

In operation S112 of the terminal 10, by a user operation or when a certain period of time has elapsed since operation S111 was performed, the terminal 10 transmits a migration request to the cloud server 20.

The subsequent operations (operations S113 to S119 and S209 to S213) illustrated in FIG. 8B may be performed in a manner similar to the operations S202 to S208 and S106 to S111 illustrated in FIG. 8A. Thus, the description of the subsequent operations will be omitted here.

As described above, in the cloud system 1 according to the embodiment, the terminal 10 serving as a migration source and the cloud server 20 serving as a migration destination execute the common application. In the cloud system 1 according to the embodiment, in the migration destination, rebinding for fixed resources is performed by copying the values of variables of the executed instance (an instance that has been executed) to the variable of a generated instance. Thus, the cloud system 1 according to the embodiment may easily perform rebinding for fixed resources.

Although an embodiment related to a disclosed apparatus has been explained, various different embodiments may be made. Other embodiments will be described below.

For example, in the above embodiment, a case where an apparatus serving as a migration destination stores an application whose source has been altered in advance and a fixed resource list is illustrated. the disclosed apparatus is not limited to this. For example, at the time of migration, an apparatus serving as a migration source may transmit, to an apparatus serving as a migration destination, an application whose source has been altered in advance and a fixed resource list. In this case, the apparatus serving as a migration destination executes the received application, and performs migration using the received fixed resource list, in a manner similar to that described above.

Furthermore, in the processing described in the above embodiment, the entire or part of the processing described as processing that is automatically performed may be manually performed. Furthermore, in the processing described in the first embodiment, the entire or part of the processing described as processing that is manually performed may be automatically performed in a well-known method. For example, in operations S208 and S119, a human being may update the instance management table.

Furthermore, in accordance with various loads and use conditions, processing in each operation explained in each embodiment may be divided into sub-operations or combined together in an appropriate manner. Alternatively, some operations may be omitted. For example, the processing of operation S102 and the processing of operation S103 may be combined together.

Furthermore, in accordance with various loads and use conditions, the order of processing in operations described in each embodiment may be changed.

Furthermore, components of each device are functionally and conceptually illustrated in the drawings and may not be physically configured as illustrated in the drawings. That is, the specific state of distribution and integration of individual devices is not limited to the examples illustrated in the drawings. The entire or part of the individual devices may be functionally or physically distributed or integrated in desired units, according to various loads and use conditions. For example, the first setting unit 15*b* and the extraction unit 15*c* may be integrated together. Furthermore, the second setting unit 25*c* and the restarting unit 25*d* may be integrated together.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for migrating an application, the system comprising:
   a terminal provided with fixed-resource information identifying fixed-resource variables for referencing fixed resources, each of the fixed resources being a resource which is referenced by the application when the application is executed and on which serialization for converting an execution state into a byte sequence thereof is unable to be performed; and
   a server provided with the fixed-resource information, wherein
   the terminal is configured to:
      execute the application,
      release the fixed resources by setting a predetermined value to the fixed-resource variables identified by the fixed-resource information, among variables used by the application, extract a first execution state of the application by stopping the application, and transmit a byte sequence of the first execution state which is obtained by performing the serialization on the extracted first execution state, to the server; and the server is configured to:

activate the application, receive the byte sequence of the first execution state transmitted from the terminal, extract the fixed-resource variables identified by the fixed-resource information from among variables used by the application, set each value of the extracted fixed-resource variables to a corresponding variable of an instance of the application generated based on the first execution state which is obtained by performing, on the received byte sequence, deserialization for converting a byte sequence into an execution state, and restart the application stopped by the terminal, by activating the instance of the application to which each value of the extracted fixed-resource variables has been set.

2. The system of claim 1, wherein
the server sets information on the restarted application to a resetting variable that is referenced by the fixed resources.

3. A method for migrating an application between a terminal and a server, the method comprising:

providing the terminal and the server with fixed-resource information identifying variables for referencing fixed resources, each of the fixed resources being a resource which is referenced by the application when the application is executed and on which serialization for converting an execution state into a byte sequence is unable to be performed;

executing, by the terminal, the application;

releasing, by the terminal, the fixed resources by setting, a predetermined value to the fixed-resource variables identified by the fixed-resource information, among variables used by the application extracting, by the terminal, a first execution state of the application by stopping the application;

transmitting, by the terminal, a byte sequence of the first execution state which is made by performing the serialization on the extracted first execution state, to the server;

activating, by the server, the application;

receiving, by the server, the byte sequence of the first execution state transmitted from the terminal;

extracting, by the server, the variable identified by the fixed-resource information from among variables used by the application;

setting, by the server, a value of the extracted variable to a corresponding variable of an instance of the application generated based on the first execution state which is obtained by performing, on the received byte sequence, deserialization for converting a byte sequence into an execution state; and restarting, by the server, the application stopped by the terminal, by activating the instance of the application to which the value of the extracted variable has been set.

4. The method of claim 3, wherein
the server sets information on the restarted application to a resetting variable that is referenced by the fixed resources.

* * * * *

UNITED STATES PATENT AND TRADEMARK OFFICE
CERTIFICATE OF CORRECTION

PATENT NO. : 9,146,779 B2  
APPLICATION NO. : 13/424693  
DATED : September 29, 2015  
INVENTOR(S) : Hideto Kihara

Page 1 of 1

It is certified that error appears in the above-identified patent and that said Letters Patent is hereby corrected as shown below:

On the title page item 73 Assignee, Line 1

Delete "Kawasakin" and insert --Kawasaki--, therefor.

Signed and Sealed this
Fifteenth Day of March, 2016

Michelle K. Lee
*Director of the United States Patent and Trademark Office*